United States Patent [19]

Child

[11] Patent Number: 5,716,893

[45] Date of Patent: Feb. 10, 1998

[54] METHOD OF ENHANCING THE STABILITY OF CONDUCTIVE POLYMERS

[75] Inventor: Andrew David Child, Spartanburg, S.C.

[73] Assignee: Milliken Research Corporation, Spartanburg, Calif.

[21] Appl. No.: 572,997

[22] Filed: Dec. 15, 1995

[51] Int. Cl.$^6$ .................... B32B 27/06; B32B 27/28
[52] U.S. Cl. .................... 442/63; 442/110; 442/115
[58] Field of Search ........................ 442/63, 110

[56] References Cited

U.S. PATENT DOCUMENTS

| | | | |
|---|---|---|---|
| 4,803,096 | 2/1989 | Kuhn et al. | 427/121 |
| 4,877,646 | 10/1989 | Kuhn et al. | 427/121 |
| 4,975,317 | 12/1990 | Kuhn et al. | 428/253 |
| 4,981,718 | 1/1991 | Kuhn et al. | 427/121 |
| 5,108,829 | 4/1992 | Kuhn | 428/253 |
| 5,176,851 | 1/1993 | Barry, Jr. | 252/500 |
| 5,393,610 | 2/1995 | Witucki et al. | 428/447 |

OTHER PUBLICATIONS

Stability of Chemically Synthesized Polypyrrole Films (Synthetic Metals 59, (1993) 81–96).
Thermal Stability of Polypyrroles (Polymer International 27, (1992) 187–195).
Kinetics of Degradation of the Electrical Conductivity of Polypyrrole under Thermal Aging (Polymer Degradation and Stability 43, (1994) 293–298.).
An Investigation of the Conductivity Stability of Acid-doped Polyanilines (Synthetic Metals 47, (1992) 255–266.).
Effect of Thermal Annealing on the Electrical Conductivity of Polyprynole Films (Synthetic Metals, 53 (1993) 325–332.).

Primary Examiner—Ana Woodward
Attorney, Agent, or Firm—Terry T. Moyer; Timothy J. Monahan

[57] ABSTRACT

A method of depositing a conductive polymer film on a textile fabric substrate is provided by the oxidative polymerization of a pyrrole compound in the presence of a dopant anion and a stabilizing agent having the formula:

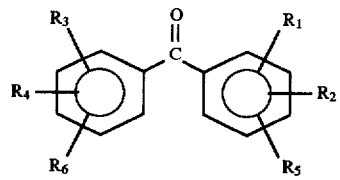

wherein $R_1$, $R_2$, $R_3$ and $R_4$ are independently selected from H, OH, and OR, and R is $C_1$–$C_8$ alkyl; and $R_5$ and $R_6$ are independently selected from H, COOH and $SO_3H$.

16 Claims, 3 Drawing Sheets

METHOD OF ENHANCING THE STABILITY OF CONDUCTIVE POLYMERS

BACKGROUND OF THE INVENTION

This invention relates generally to conducting polymers, and in particular to polypyrrole formed on a substrate, such as a textile fabric, in which the polypyrrole coating has been made more stable due to the inclusion of a stabilizing agent.

Electrically conducting fabrics and the process for making them has been described in several previous patents (Kuhn et al. U.S. Pat. Nos. 4,803,096, 4,975,317, 4,877,646 and 4,981,718). The stability of the conductivity of polypyrrole films, prepared either electrochemically or chemically has been the subject of numerous publications. For example, J. C. Thieblemont et al have published several papers including: *Stability of Chemically Synthesized Polypyrrole Films* (Synthetic Metals 59, (1993) 81–96), and *Kinetics of Degradation of the Electrical Conductivity of Polypyrrole under Thermal Aging* (Polymer Degradation and Stability 43, (1994) 293–298.) In addition, V. T. Truong has published several studies including *Thermal Stability of Polypyrroles* (Polymer International 27, (1992) 187–195.) These publications indicate that the conductivity of polypyrrole films, powders, and coatings decrease over time according to either a diffusion controlled or a first-order decay process. The rate of decay is related to the choice of dopant anion, the method of preparation, and the conditions of the aging. The decay is significantly more rapid in the presence of air, indicating that the reaction of oxygen with the polymer backbone is responsible for a significant portion of the conductivity loss.

Attempts at increasing the stability of these materials to conductivity loss have led to the investigation of various dopant anions. An optimal choice for the dopant anion has been determined to be anthraquinone-2-sulfonic acid as described in Kuhn U.S. Pat. No. 5,108,829. The use of certain dopants in polyaniline, another conducting polymer, results in an increase, rather than a decrease, in the conductivity of the polymer during a thermal aging test as described in Wang and Rubner, *An Investigation of the Conductivity Stability of Acid-Doped Polyanilines* (Synthetic Metals 47, (1992) 255–266.) This phenomena is though to be due to a thermal annealing process, in which the dopant molecule acts as a plasticizer to allow for increased order in the polymer structure. This effect is further described in Barry, U.S. Pat. No. 5,176,851. Thermal annealing has also been observed in toluene sulfonic acid doped polypyrrole as reported in Turcu and Neamtu *Effect of Thermal Annealing on the Electrical Conductivity of Polypyrrole Films* (Synthetic Metals, 53 (1993) 325–332.) An increase in conductivity was reported upon thermal treatment which is believed to be result of a decrease in the defect concentration and an analogous increase in the conjugation length of the polymer.

Conducting polymer coated fabrics have the advantages of light weight, ease of manufacture, low cost, and a wide range of surface conductivities when compared to metals and carbon coated products. Nevertheless, a major limitation precluding the use of conducting polymers and conducting polymer coated fabrics in several application is the lack of conductivity stability of the polymers relative to metals and carbon-based materials.

SUMMARY OF THE INVENTION

An object of the invention is to provide a conductive polymer with improved stability towards conductivity losses and a process for achieving the same. Another object of the invention is to provide a conductive textile material. Yet another object of the invention is to provide an improved process for polymerizing pyrrole or other pyrrole compound oxidatively from an aqueous solution.

Accordingly, a process is provided for synthesizing a pyrrole compound having improved stability by the oxidative polymerization of an aqueous solution of a pyrrole compound in the presence of a oxidizing agent, dopant anion and a stabilizing agent having the formula;

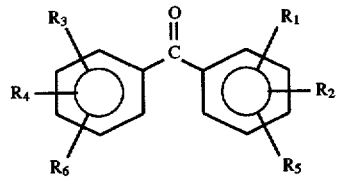

wherein $R_1$, $R_2$, $R_3$ and $R_4$ are independently selected from H, OH and OR, and R is $C_1$–$C_8$ alkyl; $R_5$ and $R_6$ are independently selected from H, COOH and $SO_3H$; and the ratio of the pyrrole compound to the stabilizing agent, by weight is from 1:100 to 1:0.01. Also within the scope of the present invention is a composite material of the polypyrrole compound on a substrate, such as a textile fabric, which is made by contacting the substrate with the aqueous solution of reactants during polymerization.

In addition to the aforementioned objectives, the composite material and method the present invention has the advantages that the conductivity of the polymer (1) briefly increases when the polymer is heated above ambient temperatures; and (2) then decreases at a rate that is substantially slower than conductive polymers synthesized without a stabilizing agent. In preferred embodiments, the invention comprises one or more of the following features:

- the stabilizing agent is soluble or dispersable in an aqueous solution of the pyrrole compound, oxidizing agent and dopant anion (the aqueous reaction liquor);
- the stabilizing agent forms a complex with the oxidizing agent in the aqueous reaction liquor; and
- the stabilizing agent is water soluble or is soluble in a water miscible organic solvent.

DETAILED DESCRIPTION OF THE INVENTION

Figure 1:
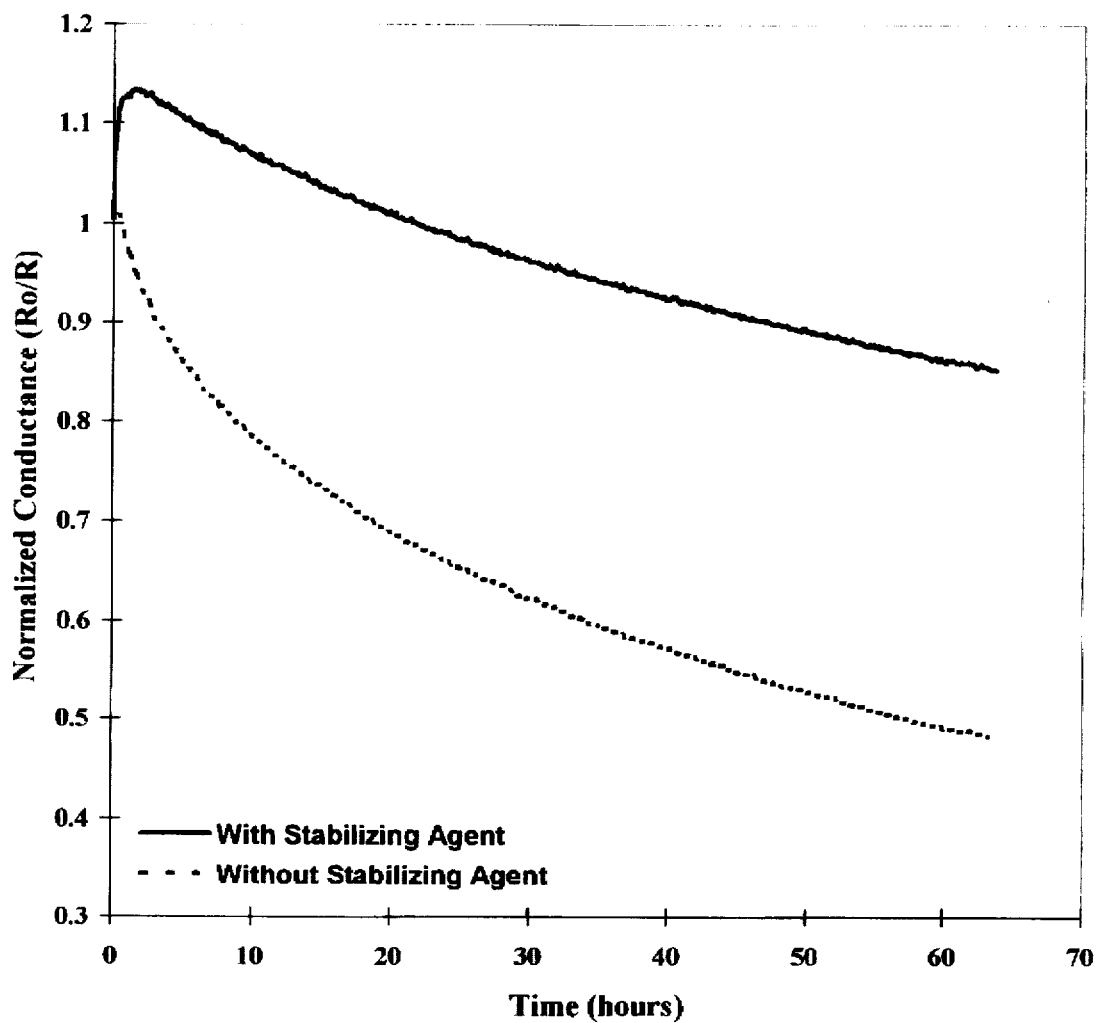
FIG. 1 is a graph of the change in resistivity measured as the initial resistivity ($R_0$) divided by the present resistivity (R) plotted as a function of time at 100° C. for polypyrrole both with and without the stabilizing agent.

Without limiting the scope of the invention, the preferred embodiments and features are hereinafter set forth. Unless otherwise indicated, all parts and percentages are by weight and conditions are ambient, i.e. one atmosphere of pressure and 25° C.

The terms aryl and arylene are intended to be limited to single and fused double ring aromatic hydrocarbons. Unless otherwise specified, aliphatic hydrocarbons are from 1 to 12 carbons in length and cycloaliphatic hydrocarbons comprise from 3 to 8 carbon atoms.

All the United States patents identified in the specification are hereby incorporated by reference.

The invention is directed to the oxidative polymerization of a pyrrole compound in an aqueous solution, preferably in the presence of a substrate, thereby forming a conductive polymer film thereon. Examples of oxidative polymerization of pyrrole to form a conductive textile material may be found in the following patents: U.S. Pat. Nos. 4,803,096; 4,877,646; 4,975,317; and 5,108,829.

The term "pyrrole compound" is intended to include pyrrole and substituted pyrrole monomers which may be polymerized and made conductive with a suitable dopant anion. Examples include 3- and 3,4- alkyl and aryl substituted pyrrole, N-alkyl pyrrole, and N-aryl pyrrole. Similarly, the term "polypyrrole compound" is intended to include polymers made from such pyrrole compounds and combinations thereof. Preferably, pyrrole is polymerized to form polypyrrole.

The pyrrole compound may be present in the aqueous reactant liquor at a concentration of from 0.01 to 5 grams per liter, preferably 1 to 3 grams per liter.

An oxidizing agent capable of oxidizing the pyrrole compound and promoting polymerization is also employed in the aqueous liquor. Suitable oxidizing agents are known to those with skill in the art and include chemical compounds containing a metal ion which is capable of changing its valance during the polymerization of the pyrrole compounds and include polyvalent metal containing compounds such as perchlorates, permangenates and chromates in general and the following compounds: $FeCl_3$, $Fe_2(SO_4)_3$, $KMnO_4$, $Fe(NO_3)_3$, $Fe(ClO_4)$, $K_3(Fe(CN)_6)$, $H_3PO_4 \cdot 12MoO_3$, $H_3PO_4 \cdot 12WO_3$, $CrO_3(NH_4)_2$ $Ce(NO_3)_6$, $CuCl_2$ and $AgNO_3$. Also included are non-metal compounds such as nitrites, quinones, peroxides, peracids, persulfates, perborates and perchlorates particularly $HNO_3$, 1,4-benzoquinone, tetrachloro-1,4-benzoquinone, hydrogen peroxide, peroxy acidic acid, peroxy benzoic acid, 3-chloroperoxybenzoic acid, ammonium persulfate and ammonium perborate. Further, the alkali metal salts, such as the sodium, potassium or lithium salts of the above compounds can also be used.

Preferably, the oxidizing agent contains a metal ion capable of complexing with the stabilizing agent, thereby acting as a dispersant or solubilizing agent in the aqueous reactant liquor. Ferric chloride has been found to be particularly useful as the oxidizing agent. The oxidizing agent is generally provided in the aqueous reactant liquor in a molar ratio relative to the pyrrole compound in the range of 1:1 to 4:1, preferably 2:1 to 3:1. Further, the concentration of the oxidizing agent is an important factor in controlling the rate of reaction and those with skill in the art will recognize that higher or lower amounts of the oxidizing agent may be employed to control the rate of polymerization or to assure maximum utilization of the pyrrole compound. Some oxidizing agents, such as ferric chloride, may perform as both an oxidizing agent and a dopant anion, in which case the molar ratio of the oxidizing agent to the pyrrole compound may be even greater than 4:1.

As is well known in the art, it is necessary to include a dopant union in the network of the polypyrrole compound to provide conductivity. Conveniently, the dopant anion may be present in the aqueous reactant liquor during polymerization. A large number of suitable dopant anions are known in the art and appear in the relevant literature, as well as the references cited herein. Particularly useful are the aryl sulfonic acids, such as benzenesulfonic acid, p-toluenesulfonic acid, p-chlorobenzenesulfonic acid, naphthalene disulfonic acid and anthraquinone sulfonic acid, particularly anthraquinone-2-sulfonic acid.

The polymerization reaction may be conducted at a pH of from 1 to 5, preferably from 1 to 3. In addition to the dopant anion, increased acidity can be conveniently provided by acids such as HCl or $H_2SO_4$.

A substrate, such as a textile material, may be provided in the reaction liquor and it has been found that a coherent polypyrrole film will be deposited thereon. The textile material may be in the form of staple, continuous filaments, spun yarn, continuous multifilament yarn or in the form of a fabric. Preferably, the textile material is in the form of a woven or knit fabric constructed from continuous multifilament yarn at the time the polymer film is deposited on the fibers.

A wide variety of natural and synthetic fibers may be used as the textile material. By way of example, the following substrate materials may be employed: polyamide fibers, including nylon, such as nylon 6 and nylon 6,6, and aramid fibers; polyester fibers, such as polyethylene teraphthalate (PET), polyolefin fibers, such as polypropylene and polyethylene, acrylic fibers, polyurethane fibers, cellulosic fibers, such as cotton, rayon and acetate; silk and wool fibers, and high modulus inorganic fibers, such as glass, quartz and ceramic fibers.

The conductive polymer may be framed on the textile material in amounts corresponding to about 0.5% to about 4%, preferably 1.0% to about 3%, by weight based on the weight of the textile. Thus for example, for fabric weighing 100 grams, a polymer film of about 2 grams may be formed on the fabric. The film thickness may range from 0.05 to about 2 microns, preferably from about 0.1 to 1 micron.

In general, from about 10 to 150 grams, preferably from 30 to 100 grams of textile material is provided per liter of aqueous reactant liquor.

A stabilizing agent is dispersed or dissolved in the aqueous reactant liquor. The stabilizing agent has the formula:

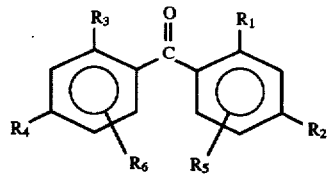

wherein $R_1$, $R_2$, $R_3$ and $R_4$ are independently selected from H, OH and OR, and R is $C_1$–$C_8$ alkyl; $R_5$ and $R_6$ are independently selected from H, COOH and $SO_3H$; and the ratio of the pyrrole compound to the stabilizing agent, by weight is from 1:100 to 1:0.01. Preferably, at least one of $R_1$, $R_2$, $R_3$ and $R_4$ is OH, most preferably $R_1$ is OH. Preferably $R_5$ and $R_6$ are H. Examples of suitable compounds include benzophenone, dihydroxybenzophenone, especially 2,4-dihydroxybenzophenone, tetrahydroxybenzophenone, especially 2, 2', 4, 4'-tetrahydroxybenzophoneone and 2, 4-dihydroxy -5-especially sulfonate-benzophenone.

The ratio of the pyrrole to the stabilizing agent, by weight is from 1:100 to 1:0.01, preferably 1:20 to 1:0.05.

The stabilizing agent is sparingly soluble in the aqueous reactant liquor. Dispersion or dissolution of the stabilizing agent can be accomplished more easily by first dissolving the stabilizing agent in a small amount of a polar organic solvent, particularly a water miscible organic solvent, prior to adding the stabilizing agent to the aqueous liquor. For example, one part of the stabilizing agent may be dissolved in from one to four parts of the polar organic solvent. Suitable polar organic solvents include methanol, ethanol, isopropanol, and acetone, with methanol being preferred. The solution of the stabilizing agent and polar organic solvent may be conveniently added to a concentrated solution of the oxidizing agent, and then the mixture diluted with water to the desired final concentration.

The polymerization reaction is typically initiated by combining the pyrrole compound, oxidizing agent, dopant anion and stabilizing agent in an aqueous liquor, which optionally has a substrate, such as textile material present. When it is desirable to deposit the conductive polymer film onto a substrate, it is important to control the rate of reaction and avoid formation of the polymer in the liquor rather than on the surface of the substrate. Further, it has been found that by controlling the rate of reaction, a more ordered and thus, conductive film is deposited on the substrate. The rate of the polymerization reaction is influenced by a number of factors, particularly the reaction temperature, selection of the oxidizing agent and its concentration relative to the pyrrole compound, pH, surface area of the substrate, and agitation.

The polymerization reaction can be run as a batch reaction or continuously, by replenishing the reactants. The batch reaction typically takes from 45 minutes to four hours to complete.

Electrically conductive textiles having a resistivity of 1000 Ω per square or less, preferably 500 Ω per square or less may be produced according to the present invention. Standard test methods are available in the textile industry and, in particular, AATCC test method 76-1982 is available and has been used for the purpose of measuring resistivity of textile fabrics. According to this methods, two parallel electrodes 2 inches long are contacted with the fabric and placed 1 inch apart. Resistivity may then be measured with a standard ohm meter capable of measuring values between 1 and 20 million ohms. Measurements must then be multiplied by 2 in order to obtain resistivity in ohms on a per square basis. While conditioning of the samples may ordinarily be required to specific relative humidity levels, it has been found that conditioning of the samples made according to the present invention is not necessary since conductivity measurements do not vary significantly at different humidity levels. The measurements reported are, however, conducted in a room which is set to a temperature of 70° F. and 50% relative humidity. Resistivity measurements are reported herein and in the examples in ohms per square (Ω/sq) and under these conditions the corresponding conductivity is one divided by resistivity.

The invention may further be understood by reference to the following examples, but the invention is not intended to be construed as being limited thereby.

EXAMPLE 1

The following reaction mixture was introduced into an 8 ounce jar according to the procedure outlined below.

| | |
|---|---|
| Polyester fabric | 7.50 grams |
| Water | 140.00 grams |
| Pyrrole | 0.20 grams |

-continued

| | |
|---|---|
| 2,4-Dihydroxybenzophenone | 0.20 grams |
| Anthraquinone-2-sulfonic acid | 0.22 grams |
| 38.9% Ferric Chloride solution | 2.90 grams |

The 2,4-dihydroxybenzophenone was first dissolved in 10 ml of methanol and added to the 38.9% ferric chloride solution. A dark brown complex was formed which was introduced into the jar containing the water. Next, the anthraquinone-2-sulfonate (sodium salt) was introduced and the fabric was wet with this solution. Finally, the jar was charged with pyrrole and tumbled for 120 minutes.

The resulting fabric was a dark gray/black color and was allowed to air dry. A 2"×2" sample was cut from the fabric and placed in a four-probe conductivity testing device. A current was passed through the sample and the voltage drop between two contacts was measured, thus determining the resistivity of the sample. The testing device containing the sample was placed in a forced air oven held at 100° C. The resistivity was recorded continuously over a 64 hour period with data accumulated every 3 minutes. An identical test was conducted on fabric produced in the same way without any 2,4-dihydroxybenzophenone added to the reaction mixture. In each case the relative resistivity change, reported as the initial resistivity ($R_o$) divided by the present resistivity (R), is plotted as function of time as shown in FIG. 1.

The sample containing the 2,4-dihydroxybenzophenone displays an initial increase in conductivity, and then a slower decrease than the control sample. After 60 hours, the control has lost nearly 50% of its initial conductivity, whereas the sample of the present invention has lost only 11% of its initial resistivity.

Without being bound to a particular theory, it is believed that polymers with a more compact and smooth morphology inhibit diffusion of oxygen through the film, thus allowing for greater stability. The stability enhancement described in this invention may be due to the influence of the additive on the morphology of the conducting polymer film and the increased order brought about by plastization of the polymer by the additive during thermal aging.

Figure 2:
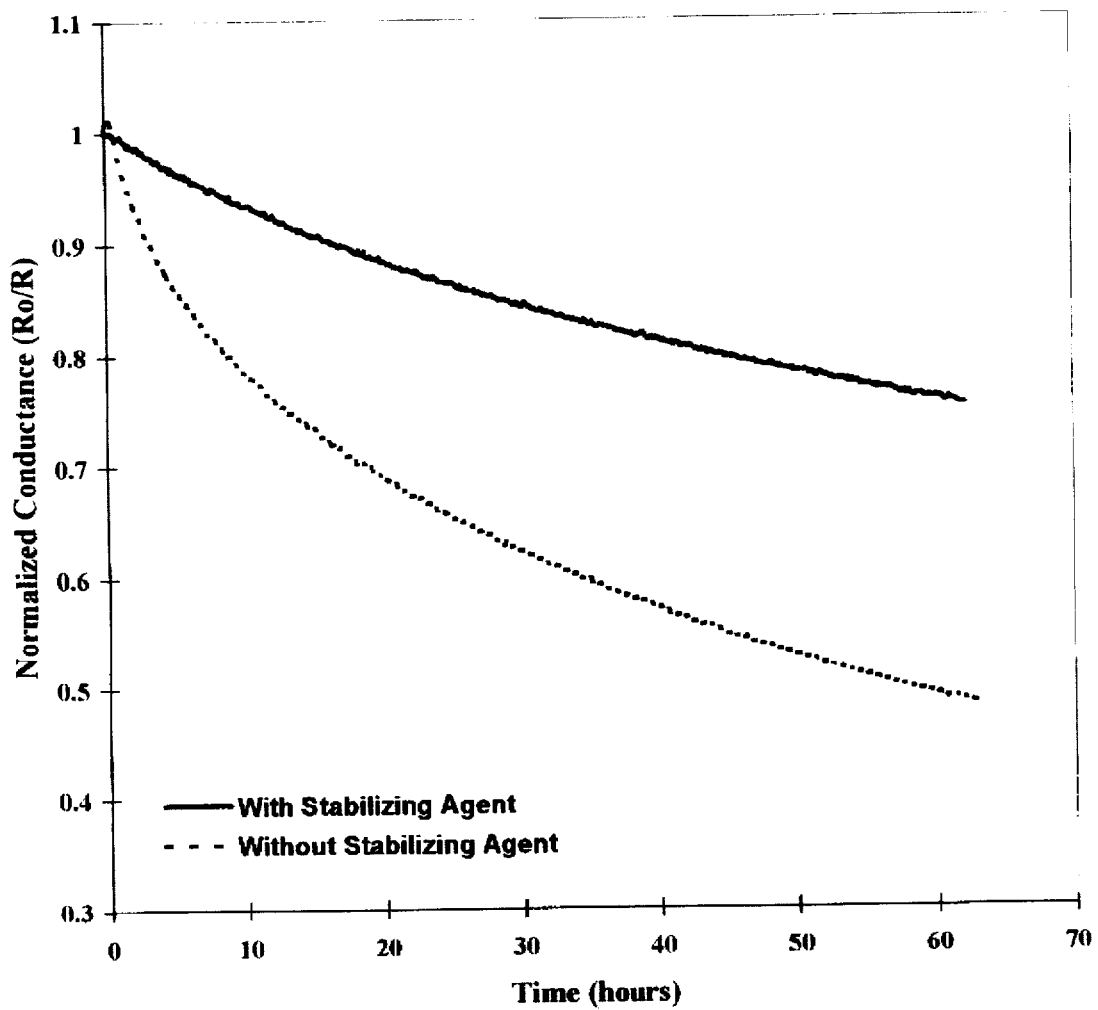
FIG. 2 is a graph comparing the change in resistivity of polypyrrole both with and without the stabilizing agent plotted as a function of time at 100° C., wherein the initial increase in conductivity of the polypyrrole sample containing the stabilizing agent has been compensated for by selecting the lowest value of R as $R_0$.

To ensure that the apparent increase in stability is not due solely to the initial increase in conductivity, the decay curve of the sample with 2,4-dihydroxybenzophenone was replotted using the lowest value of resistivity as $R_o$ instead of the initial value. The results are shown in FIG. 2.

These results show that the material has a decay curve with a smaller slope, and that the increase in stability in not due solely to an initial increase in conductivity.

EXAMPLE 2

The following example demonstrates that the increase in stability and the increase in initial conductivity is related to the amount of the stabilizing agent introduced into the conducting polymer film.

A piece of polyester fabric was made conducting according to the method described in Example 1 with the exception of a lower concentration of monomer, dopant, and oxidant as described in the formulation below.

| | |
|---|---|
| Polyester fabric | 7.50 grams |
| Water | 140.00 grams |
| Pyrrole | 0.05 grams |
| 2,4-Dihydroxybenzophenone | 0.20 grams |

-continued

| | |
|---|---|
| Anthraquinone-2-sulfonic acid | 0.06 grams |
| 38.9% Ferric Chloride solution | 0.73 grams |

Figure 3:
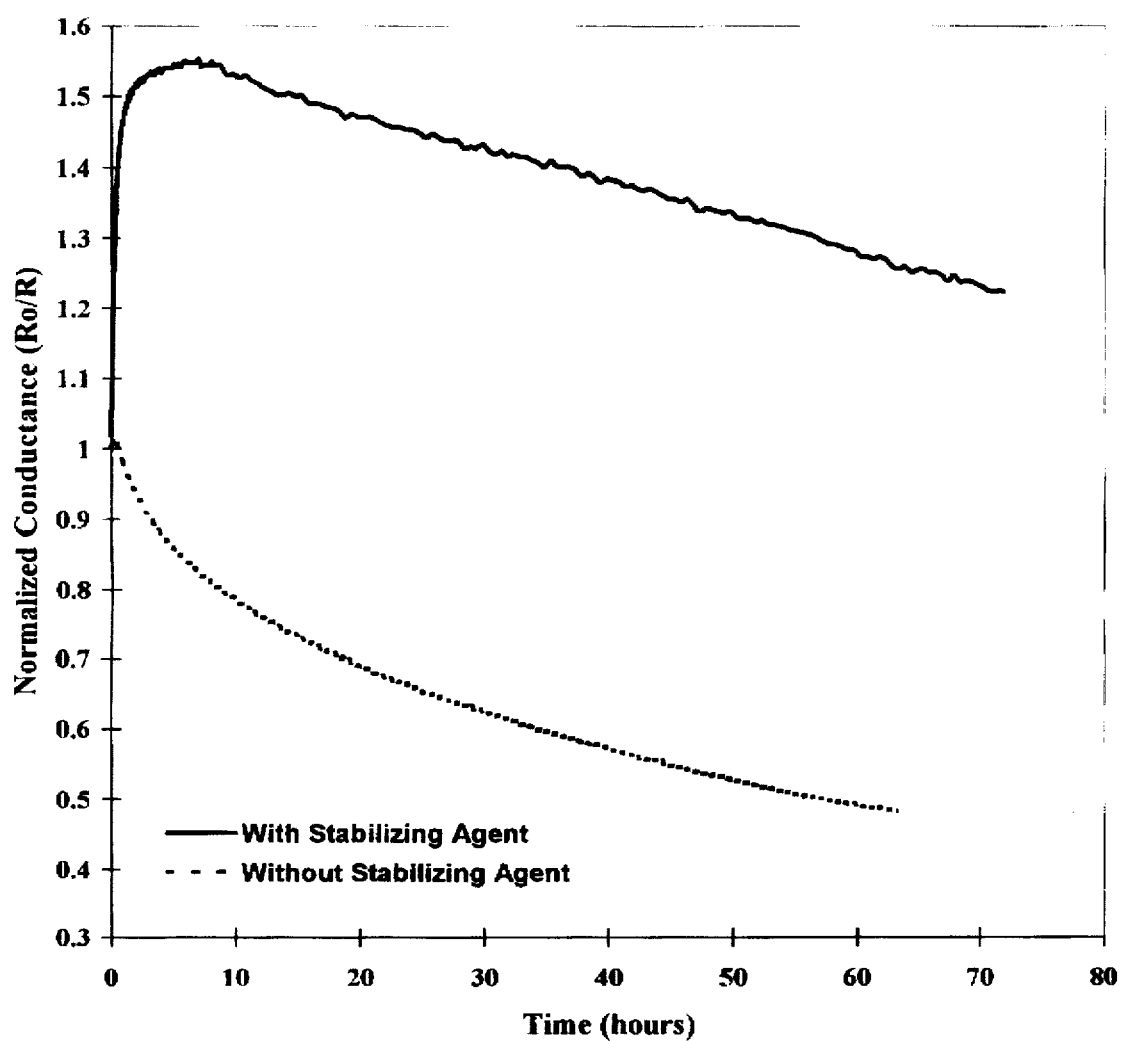
FIG. 3 is a graph of the change in resistivity of polypyrrole samples both with and without the stabilizing agent plotted as a function of time at 100° C., wherein the ratio of the pyrrole to stabilizing agent in the aqueous liquor is 1:4.

A sample of this fabric was subjected to conductivity measurements as described for Example 1. The fabric of Example 2 was compared to an identically treated fabric, made without any 2,4-dihydroxybenzophenone present in the reaction liquor. The results of the testing are shown below in FIG. 3.

The aging tests in Example 2 show an even more dramatic increase in the initial conductivity and in the stability of the sample.

There are, of course, many alternative embodiments and modifications of the invention, which are intended to be included in the scope of the following claims.

What I claim is:

1. A conductive textile material made by the process comprising the oxidative polymerization of a pyrrole compound in an aqueous liquor containing the pyrrole compound, an oxidative agent, a dopant anion, a stabilizing agent having the formula:

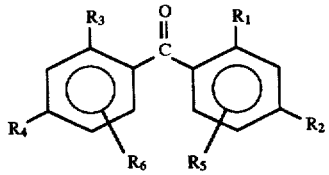

where $R_1$, $R_2$, $R_3$ and $R_4$ are independently selected from H, OH and OR, and R is $C_1$–$C_8$ alkyl; and $R_5$ and $R_6$ are independently selected from H, COOH and $SO_3H$; and the ratio of the pyrrole compound to the stabilizing agent, by weight, is from 1:100 to 1:0.01, and a textile substrate, wherein a polypyrrole compound film is deposited on the substrate.

2. The material of claim 1, wherein the textile substrate is in the form of a woven or knit fabric.

3. The material of claim 1 wherein the ratio of the pyrrole compound to the stabilizing agent, by weight, is from 1:20 to 1:0.05.

4. The material of claim 3 wherein the stabilizing agent has the formula:

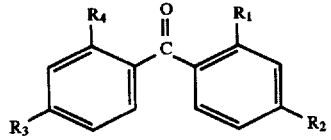

and $R_5$ and $R_6$ are hydrogen.

5. The material of claim 4 wherein the oxidative agent is a metal containing compound which is capable of complexing with the stabilizing agent.

6. The material of claim 5 wherein the aqueous liquor comprises from 0.01 to 5 grams per liter of the pyrrole compound and the dopant anion is anthraquinone-2-sulfonic acid.

7. The material of claim 3 wherein the stabilizing agent is selected from the group consisting of benzophenone, dihydroxybenzophenone, and tetrahydroxybenzophenone.

8. The material of claim 7 wherein the aqueous liquor comprises from 0.01 to 5 grams per liter of the pyrrole compound.

9. The material of claim 8 wherein the oxidative agent is selected from the group consisting of ferric chloride, potassium permangenate, ferric nitrate and ferric perchlorate.

10. The material of claim 3 wherein the aqueous liquor comprises from 0.01 to 5 grams per liter of the pyrrole compound, the oxidative agent is ferric chloride, the stabilizing agent is 2,4-dihydroxybenzophenone and the textile substrate is a woven or knit fabric.

11. A conductive textile material comprising a textile substrate having from 0.5 to 4 wt %, based on the weight of the substrate, of a conductive film of a polypyrrole compound having a stabilizing agent introduced into the film, the stabilizing agent having the formula:

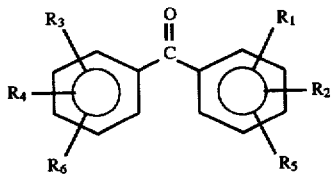

where $R_1$, $R_2$, $R_3$ and $R_4$ are independently selected from H, OH and OR, and R is $C_1$–$C_8$ alkyl; $R_5$ and $R_6$ are independently selected from H, COOH and $SO_3H$.

12. The material of claim 11 wherein the stabilizing agent has the formula:

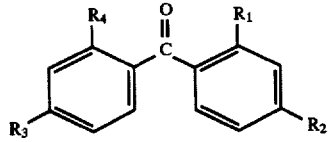

and $R_5$ and $R_6$ are hydrogen.

13. The material of claim 12 wherein the textile substrate is in the form of a woven or knit fabric.

14. The material of claim 11 wherein the stabilizing agent is selected from the group consisting of benzophenone, dihydroxybenzophenone, and tetrahydroxybenzophenone.

15. The material of claim 11 wherein the pyrrole compound is selected from the group consisting of pyrrole and 3-, 3,4- and N-alkyl pyrrole, where the alkyl substituent has from 1 to 12 carbon atoms.

16. The material of claim 11 wherein the stabilizing agent is 2,4-dihydroxybenzophenone.

* * * * *